United States Patent [19]

Yamamura

[11] Patent Number: 4,570,181
[45] Date of Patent: Feb. 11, 1986

[54] CHARACTERISTIC EXTRACTING APPARATUS

[75] Inventor: Tatsuo Yamamura, Hino, Japan

[73] Assignee: Fuji Electric Company, Ltd., Kawasaki, Japan

[21] Appl. No.: 466,124

[22] Filed: Feb. 14, 1983

[30] Foreign Application Priority Data

Feb. 18, 1982 [JP] Japan .................................. 57-23594

[51] Int. Cl.$^4$ ............................................. H04N 5/14
[52] U.S. Cl. ................................... 358/160; 358/107; 358/199; 382/48
[58] Field of Search ................. 358/107, 160, 53, 241, 358/903, 198, 285; 382/58, 60, 62, 63, 65, 48

[56] References Cited

U.S. PATENT DOCUMENTS

| | | | |
|---|---|---|---|
| 4,242,662 | 12/1980 | Tsujiyama et al. | 382/48 |
| 4,398,256 | 8/1983 | Nussmeier et al. | 358/160 |
| 4,400,728 | 8/1983 | Long | 358/107 |
| 4,450,579 | 5/1984 | Nakashima et al. | 382/48 |

Primary Examiner—Tommy P. Chin
Assistant Examiner—Michael D. Parker
Attorney, Agent, or Firm—Brumbaugh, Graves, Donohue & Raymond

[57] ABSTRACT

A window signal generating device for use in a video scanning apparatus, for producing a window signal during selected periods when a video scanning signal is in an observation region window of interest to facilitate scanning only from objects which appear in selectively defined windows of a viewing area, comprising, an addressable memory for storing information indicating the starting and ending boundaries of each window of interest in a viewing area, a memory address driver for addressing locations in memory containing the stored boundary information for a horizontal scan line in response to a horizontal scan line signal, a counter for receiving horizontal and vertical synchronous signals and for providing a video scanning position output signal, and a comparator circuit for receiving the video scanning position output signal from the counter and the starting and ending boundary data from the memory, and for producing a window output signal when the video scanning position is within the boundaries of a window. A scan data memory receives and stores data from objects within the windows.

15 Claims, 8 Drawing Figures (a)          (b)

CHARACTERISTIC EXTRACTING APPARATUS

BACKGROUND OF THE INVENTION

The present invention relates to a data scanning and extracting apparatus for obtaining data by raster scanning a plurality of objects through observation regions called "windows" when images of the object are picked up by an image pickup device such as an ITV (industrial television) camera.

It is generally a well known practice in the art of image processing to provide observation regions or two-dimensional windows for observing an image picked up by an image pickup device such as a television camera and to take out only the image data which appears through the windows. This practice is especially advantageous in the case where useful information is limited to a particular location, since that location can be separated from other areas by a window, thereby facilitating data processing. Where items of useful information are scattered around in one displayed image, it is desirable to create as many windows as there are items of desired information and for the windows be available in different shapes. Typically, a window defining circuit and a data extraction circuit has been required for each window. Therefore, in order to generate a multiplicity of windows a complex and enormous circuit has been required to extract the data in each window.

One conventional window generator is arranged to create rectangular windows of desired sizes each having sides parallel to horizontal (X) and vertical (Y) directions of the television camera screen. FIG. 1 of the accompanying drawings is a block diagram of such a conventional window generator, and FIG. 2 is a diagram illustrative of the position and shape of a window to be generated.

In. FIG. 1, the window generator includes window boundary setting units (digital switches) 1 through 4, comparators 5 through 8, a vertical coordinate output counter 9, a horizontal coordinate output counter 10, and AND gates AN1 through AN3. Designated at VSYC is a vertical synchronous signal, HSYC a horizontal synchronous signal, WINDO a window (region) signal, and CKOM a clock signal for detecting horizontal positions. The setting units 1, 2 serve to set up vertical coordinates of the boundaries of a window to be generated, and the setting units 3, 4 serve to set up horizontal coordinates of the boundaries of a window. For example, in order to create a window W on a screen P, coordinates Y1, Y2, X1 and X2 are set up in the setting units 1, 2, 3 and 4, respectively. The comparators 5 through 8 are respectively supplied with the outputs from the setting units 1 through 4 and with output signals from the counters 9, 10 which are indicative of scanning positions on the image pickup device. The comparator 5, which is capable of detecting a starting boundary value, detects an interval in which a vertical scanning position exceeds a starting-boundary setting, and the comparator 6, which is capable of detecting a terminal boundary, detects an interval in which the vertical scanning position is short of a terminal boundary setting. The outputs from the comparators 5, 6 are ANDed by the AND gate AN1, which then produces a window signal indicative of the scan being within the vertical window range. Likewise, a window signal which indicates that the scan is within the horizontal window range is produced by the comparators 7, 8 and the AND gate AN2. These vertical and horizontal window signals are ANDed by the AND gate AN3, which produces a two-dimensional window signal WINDO.

The prior window generator however fails to form windows of shapes equivalent to rotated rectangular windows, that is, windows of shapes other than rectangles. Also, the number of comparators required increases with the number of windows to be formed, resulting in an enormous circuit arrangement if many windows are desired. A data processing circuit for such a plurality of windows needs to have parallel characteristic extracting circuits for the respective windows, because where a plurality of windows are to be produced horizontally, window signals are successively issued on a time-series basis for each horizontal scanning period to scan the windows from left to right, a condition which makes it impossible to process data in a window until after data in a preceding window has completely been processed.

SUMMARY OF THE INVENTION

In consideration of the foregoing, it is an object of the present invention to be capable of generating not only rectangular windows but also windows of any desired shapes, to dispense with parallel window generating circuits for generating a number of windows, and to process data with a common circuit, not with parallel circuits, after a multiplicity of windows have been created.

In accordance with the invention, a window signal generator device is provided for use in a video scanning apparatus, for producing a window signal during selected periods when a video scanning signal is within an observation region window of interest, to facilitate scanning only from objects which appear in selectively defined windows of a viewing area. The apparatus comprises addressable memory means for storing information indicating the starting and ending boundaries of each window of interest in a viewing area, memory address means for addressing locations in memory containing the stored boundary information for a horizontal scan line in response to a horizontal scan line signal, counter means for receiving horizontal and vertical synchronous signals and for providing a video scanning position output signal, and comparator means for receiving the video scanning position output signal from the counter means and the starting and ending boundary data from said memory means, and for producing a window output signal when the video scanning position is within the boundaries of a window. The apparatus according to the invention also includes means for storing the data scanned from objects within the windows.

BRIEF DESCRIPTION OF THE DRAWINGS

An embodiment of the present invention will hereinafter be described with reference to the drawings, in which.

DETAILED DESCRIPTION OF THE PREFERRED EMBODIMENT

Figure 3:
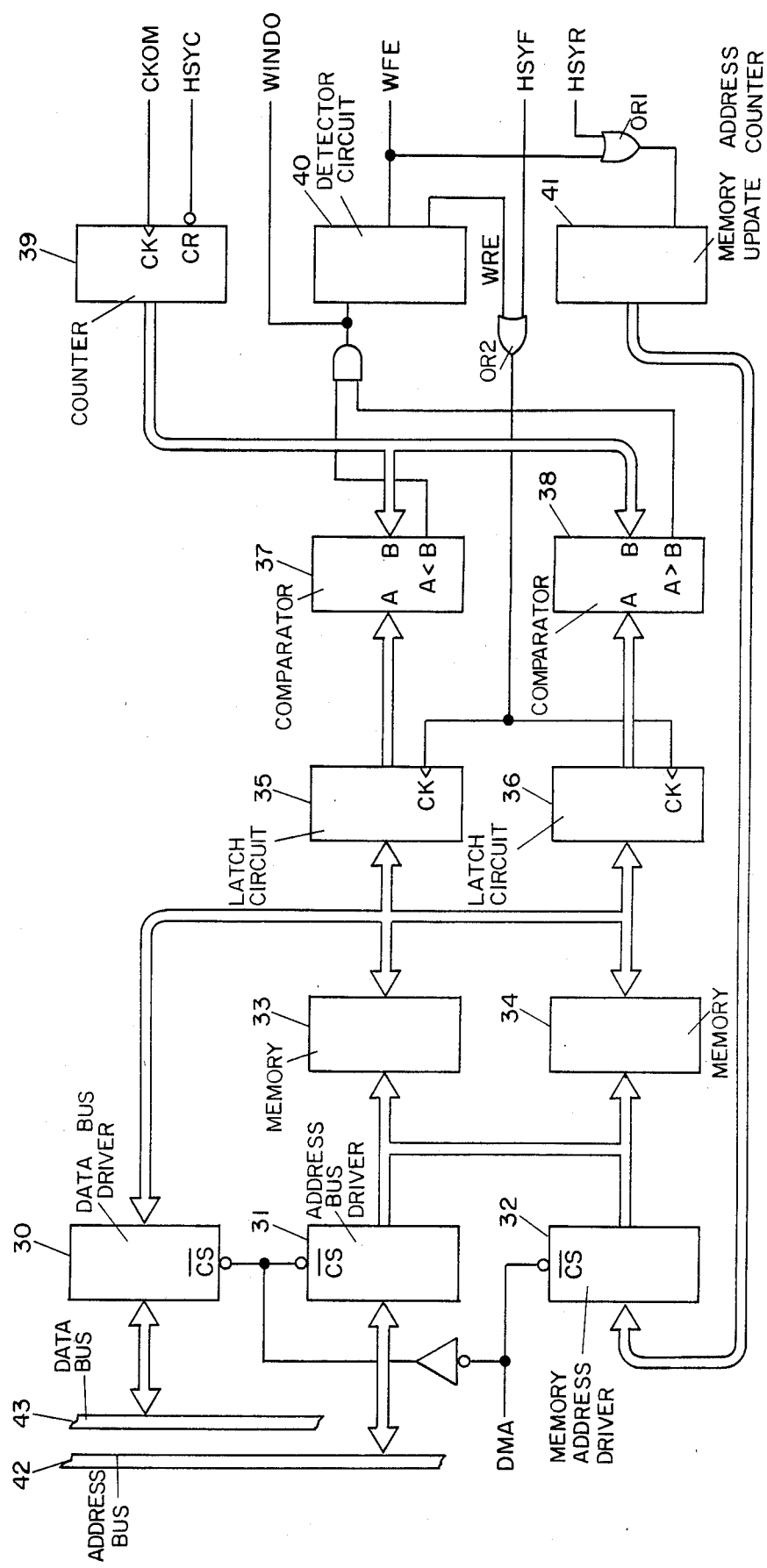
FIG. 3 is a block diagram of a window generator according to the present invention.
Figure 6:
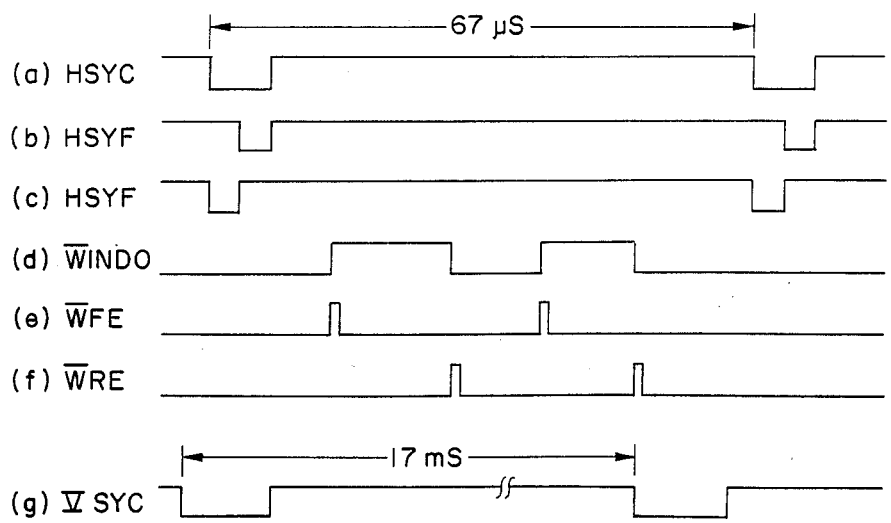
FIG. 6 is a diagram showing the waveforms of signals produced in the window generator illustrated in FIG. 3.

As shown in FIG. 3, a window generating circuit according to the invention includes a data bus driver 30, an address bus driver 31, a memory address driver 32, memories 33, 34 for storing the coordinates of starting and terminal boundaries, respectively, on horizontal scanning lines, latch circuits 35, 36 respectively for the memories 33, 34, comparators 37, 38, a counter 39 for producing a horizontal raster scan signal output indicative of a horizontal raster scan line position, a detector circuit 40 for detecting leading and trailing boundaries or edges of a window, a memory address update counter 41, and an address bus 42 and a data bus 43 which are connected to a non-illustrated data processing unit (hereinafter referred to as a "CPU"). Designated at HSYC is a horizontal synchronous signal, HSYF and HSYR start and end signals for the horizontal synchronous signal HSYC, and VSYC a vertical synchronous signal. The relative timing of these signals are shown in FIG. 6 at (a), (b), (c) and (g), respectively.

The starting-boundary coordinate memory 33 and the terminal-boundary coordinate memory 34 can be accessed by the CPU through the drivers 30, 31, respectively, and also can be accessed through the driver 32 independently of the CPU. Energization of the drivers 30, 31 or the driver 32 is controlled by a DMA signal. For generating a window, the DMA signal is a logic "0", for example, and when the memories 33, 34 are to be accessed by the CPU, the DMA signal is a logic "1". Positional information for a window to be created is written in advance in the memories 33, 34.

Figure 1:
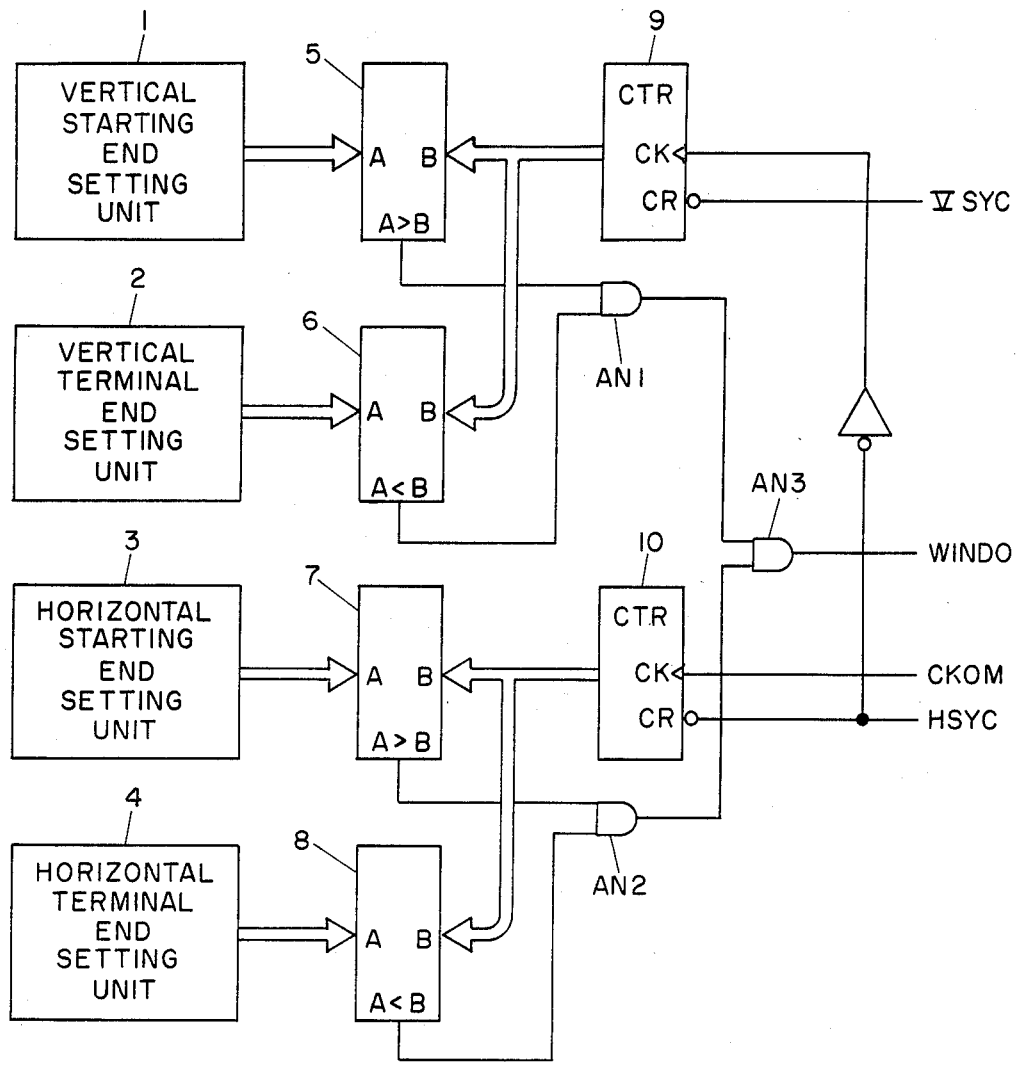
FIG. 1 is a block diagram of a conventional window generator.
Figure 2:
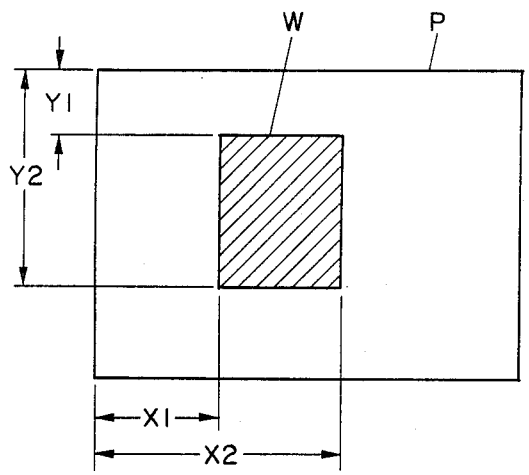
FIG. 2 is a diagram illustrative of the position and shape of a window to be generated.
Figure 4:
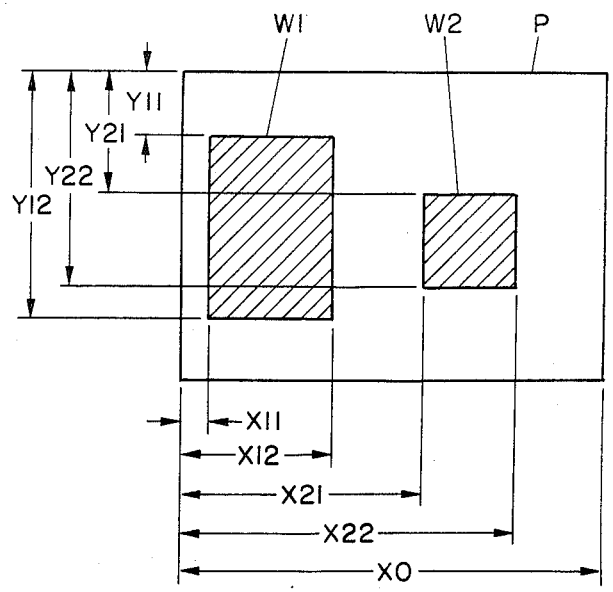
FIG. 4 is a diagram illustrating the shape and arrangement of a plurality of windows to be generated.
Figure 5:
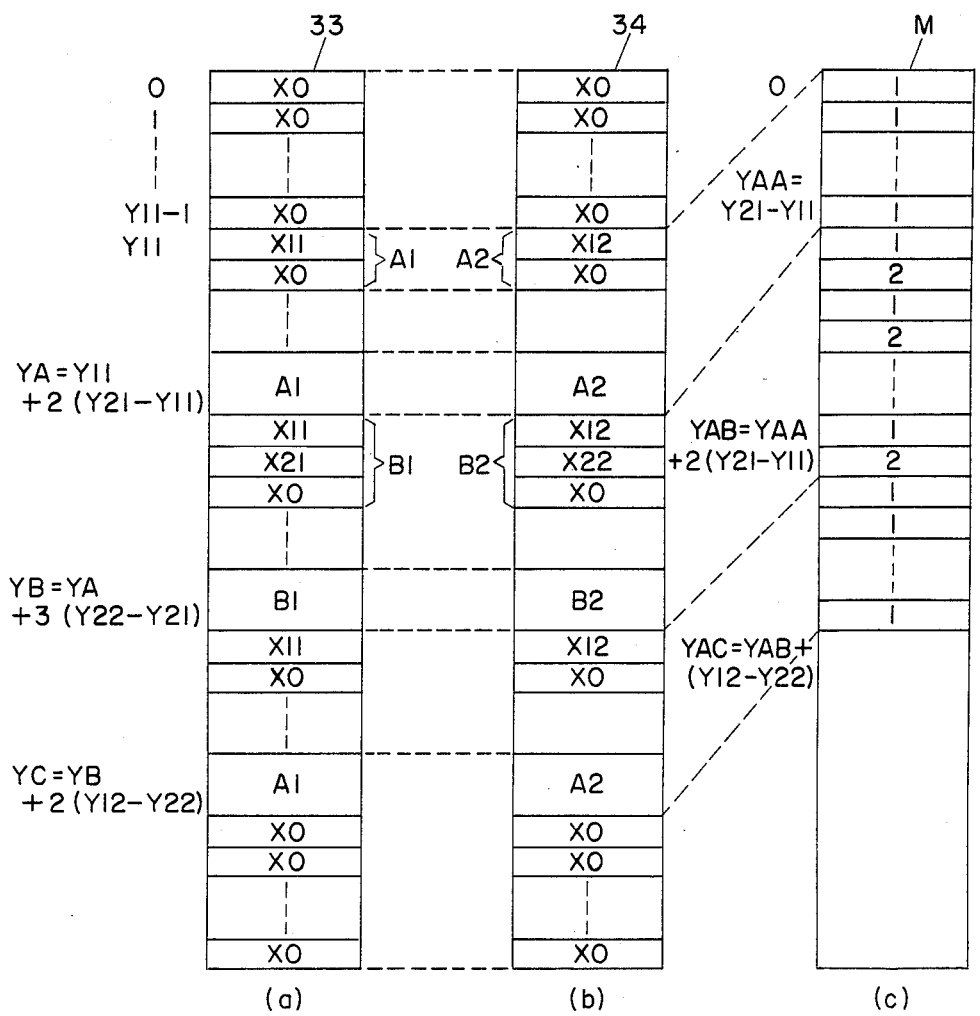
FIG. 5 is a diagram showing storage conditions of a memory for storing the position data and the numbers for windows to be created.

The coordinate of a horizontal starting boundary of a window is written in the memory 33, and the coordinate of a horizontal terminal boundary of the window is written in the memory 34. When windows W1, W2 as shown in FIG. 4 are to be generated, positional data is written into memories 33 and 34 by the CPU as illustrated in FIG. 5. More specifically, there is no data in coordinate positions Y0 through Y11, that is, from a starting position on a screen P up to a position in which a window first appears. Thus, horizontal scan ending coordinate positions X0, which are indicated of no data being present, are written successively at addresses starting from top addresses in the memories 33 and 34 in 1:1 correspondence to the horizontal scanning lines. Likewise, since only data X11, X12 for the window W1 exist for coordinate positions Y11 through Y21, these data are written, and paired data X0 representative of the presence of no other data than the data X11, X12 are written at successive addresses in the memories. Final addresses YS in the memories 33, 34 for the coordinate positions Y11 through Y21 are expressed as YA=Y11+2(Y21−Y11) since the data X11 or X12 and the data X0 are stored in pairs. For coordinate positions Y21 through Y22, data X11, X12 and data X21, X22 for the windows W1, W2, respectively, exists, and these data and data X0 are written as pairs as shown in FIG. 5 at (a) and (b). Final addresses YB for the coordinate positions Y21 through Y22 can be given by YB=YA+3(Y22−Y21). For subsequent coordinate positions, data will be written in the same manner as that in which data have been written for the coordinate positions Y11 through Y21 and Y0 through Y11.

The positional data thus stored in the memories 33, 34 are accessed through the driver 32, and latched respectively in the starting-boundary and termainl-boundary latch circuits 35, 36. The comparators 37, 38 compare outputs from the latch circuits 35, 36 with a horizontal raster scan signal output from the counter 39 which is indicative of a position on a horizontal raster scan line to detect starting and terminal points on the horizontal scanning line. The comparators 37, 38 produce signals during a period of time which is determined by these starting and terminal points for generating window signals WINDO as shown in FIG. 6 at (d). The window signals WINDO are supplied to the leading-edge and trailing-edge detecting circuit 40, which detects leading and trailing edges of the window signals as shown in FIG. 6 at (e) and (f). Window leading edge signals WFE and the horizontal scan ending signal HSYR are ORed in OR gate OR1 to produce clock signals for the memory address update counter 41. Therefore, the counter 41 counts up the horizontal scanning end signal HSYR and also counts up the window signals WINDO during a horizontal scanning period. Window trailing edge signals WRE and the horizontal scan starting signal HSYF are ORed in OR gate OR2 to produce a timing signal for latching data accessed in the memories 33, 34 by an output from the memory address update counter 41 into the latch circuits 35, 36, respectively.

For reading the stored data out of the memories 33, 34, the top addresses are first accessed to latch the horizontal scan ending coordinate X0 into the latch circuits 35, 36 with the horizontal scan starting signal HSYF. At this time, the output from the horizontal scanning position output counter 39 does not exceed data X0, and no window signal is produced during horizontal scanning periods in which the data X0 is latched, a condition which will continue as long as the data X0 is addressed in the memories 33, 34. The horizontal scan ending signals HSYR are successively counted up by the counter 41 until the position Y11 is reached in which the window W1 first appears, whereupon the starting boundary data X11 and the terminal boundary data X12 of the window W1 are read out and latched into the latch circuits 35, 36 by the horizontal scan starting signal HSYF. Based on the latched data, the comparators 37, 38 then detect the starting and terminal boundaries of a window signal on a scanning line.

The window signal WINDO generated is supplied to the leading and trailing edge detecting circuit 40, which detects the leading and trailing edges of the window signal WINDO. The memory address is updated by the leading edge of the WINDO signal, and the data X0 is latched by the trailing edge. Thereafter, the memory address is updated by the signal HSYR when the window signal is a logic "0", and window data for next horizontal scanning is latched by the signal HSYF.

The window signal WINDO for the window W1 is outputted for each horizontal scanning line up to the coordinate position Y21 in this manner. Likewise, the starting boundary (X21) data and the terminal boundary (X22) data of the window W2 are accessed by the leading edge of the window signal for the window W1, and latched by the trailing edge thereof, so that the window signal for the window W2 can be outputted during the interval between the coordinate positions X21 and X22. For the horizontal coordinate positions Y22 through Y12, only the window signal for the window W1 is outputted, and for the horizontal coordinate positions Y12 and below, no output window signal is produced. Therefore, a desired number of windows of desired shapes can be created on the screen simply by writing, in the memories, data on starting and terminal boundary coordinates for the windows successively in order of appearance thereof on horizontal scanning lines. Also, according to the preferred embodiment, data X0 indicative of a data boundary should be added for each horizontal scanning line.

A process of reading objects to be measured through windows generated in the foregoing manner to extract characteristics therefrom will now be described.

Figure 7:
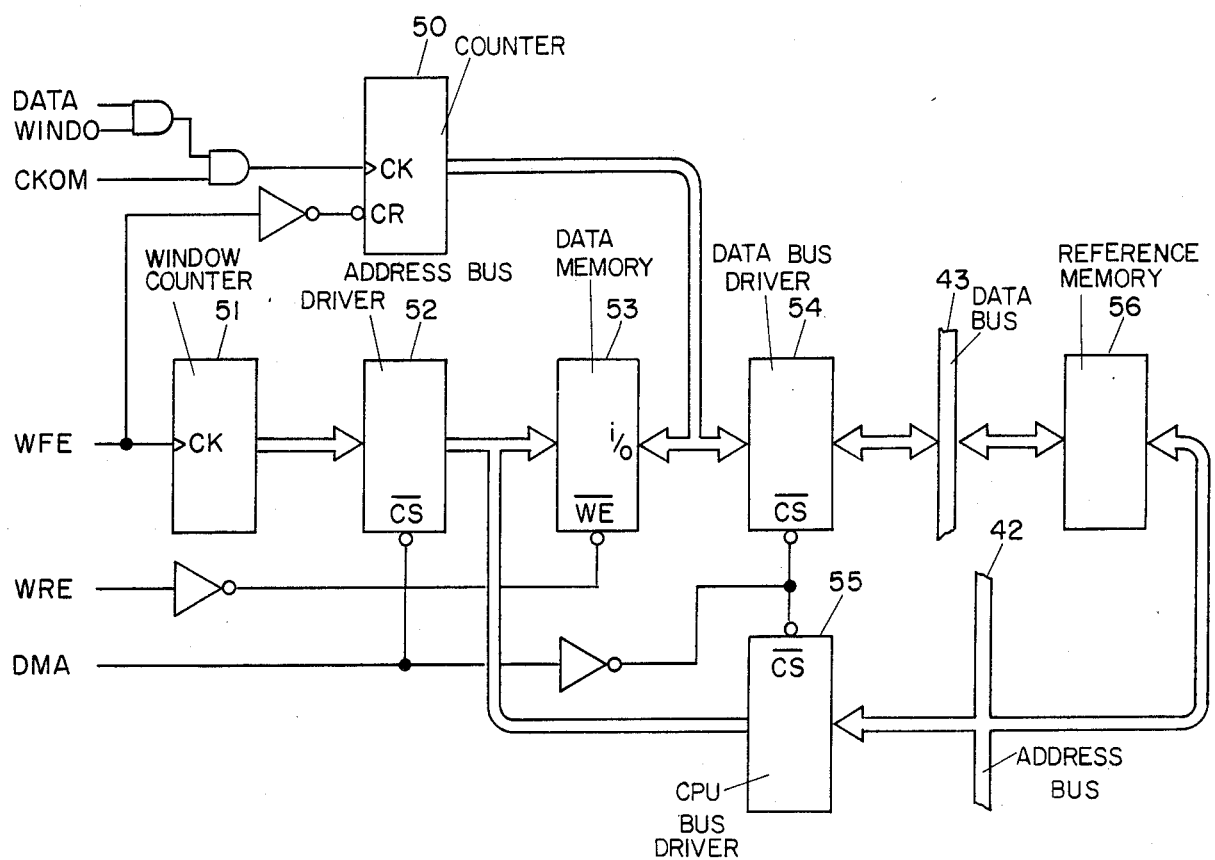
FIG. 7 is a block diagram of a characteristic extracting circuit according to the present invention.

FIG. 7 illustrates in block form a characteristic extracting circuit, which comprises a counter 50 for extracting characteristics, an address bus driver 52, a data memory 53, a CPU data bus driver 55, and a reference memory 56. Designated at 42, 43 are a CPU address bus and a CPU data bus, respectively, which are the same as those shown in FIG. 3. Signals WINDO, CKOM, WFE, WRE and DMA are also the same as those illustrated in FIG. 3. Designated at DATA is binary data for an object which is picked up as an image.

The signal DMA serves, as in FIG. 3, to energize the address bus driver 52 only when generating a window, and to energize the data bus driver 55 and the address bus driver 54 for enabling the CPU to access the data memory 53 at other times. When creating a window, the window leading edge signal WFE is counted by the window counter 51 and its count is input as an address for the data memory 53. The counter 50 is cleared each time the window leading edge signal WFE is produced, and counts binary video data in the window and writes the same into the memory 53 with the window trailing edge signal WRE. Each time the window signal is generated, the memory address is counted up by the window counter 50, and the binary data in the window is written into the data memory 53. The binary data are successively stored into the memory 53 by window signals on each horizontal scanning line in the order which is in 1:1 correspondence to the data stored in the memories 33, 34. By numbering windows in order of appearance on scanning and by writing in the reference memory 56 window numbers or symbols to which belong the coordinates of starting and terminal ends in the memories 33, 34, as shown in FIG. 5 at (c), the data memory 53 after all windows have been created stores binary data having window numbers corresponding to those stored in the reference memory 56 for each horizontal scanning line. Therefore, the area of each window can be found by adding the binary data which has the same number in the CPU. The DATA data may comprise not only binary data, but also turning points at which the binary data changes from a logic "0" to a logic "1" or from a logic "1" to a logic "0", so that data on the boundary length of each window can be obtained.

Figure 8:
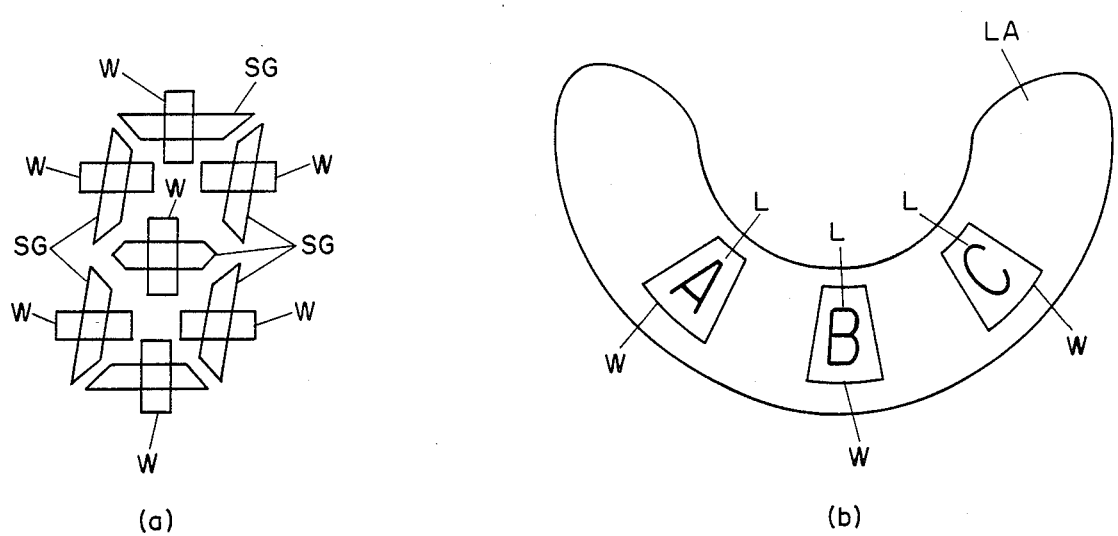
FIG. 8 is a diagram showing applications in which the present invention is incorporated.

FIG. 8 is illustrative of applications in which the present invention may be incorporated. FIG. 8 shows at (a) a seven-segment display unit composed of segments SG with windows W overlapped respectively thereon. The seven-segment display unit can be checked for its function by finding the total area of the window produced for each displayed numeral and comparing the area with a preset value. FIG. 8 also shows at (b) a label LA of a curved contour having printed characters L. The printing of any of the characters can be checked by finding the area of windows W generated over the characters or objects substantially in the same profile, and examining the area thus found.

With the arrangement of the present invention, as described above, a desired number of windows of desired shapes can be generated for simplifying data processing of the images of objects to be measured. Since the memory and circuit for reading the content of the memory for generating the windows, and the characteristic extracting circuit can be shared by each of the windows, it is not necessary to provide a window generator or characteristic extracting circuit for each window to be created. Therefore, the overall arrangement according to the present invention is simple in construction and small in size.

From the foregoing, it will be observed that numerous variations and modifications may be effected without departing from the true spirit and scope of the novel spirit of the invention. It is to be understood that no limitation with respect to the specific apparatus illustrated here is intended or should be inferred. It is, of course, intended to cover by the appended claims all such modifications as fall within the scope of the claims.

What is claimed is:

1. A window signal generating device for use in a video scanning apparatus for producing a window signal when a horizontal raster scan signal indicates that a horizontal raster scan line position is within any predefined observation region window, comprising:
    addressable memory means for storing information indicating the starting and terminal boundaries on horizontal raster scan lines of a plurality of windows;
    memory address means for addressing locations in the addressable memory means containing the stored boundary information for the windows along the horizontal scan lines of a raster scan in response to a horizontal scan line signal;
    counter means for receiving a horizontal synchronous signal and for producing a horizontal raster scan signal indicative of a horizontal raster scan line position; and
    comparator means for receiving the horizontal raster scan signal and the stored boundary information for the windows which appear along each horizontal raster scan line, and for producing said window signal when the horizontal raster scan position is within the boundary of any of said windows.

2. The window signal generating device as defined in claim 1, wherein the addressable memory means stores boundary information for windows along each horizontal scan line of the raster scan at sequential memory addresses.

3. The window signal generating device as defined in claim 1, wherein the window signal generating device further includes:
    window detector circuit means for receiving the window signal, and for producing window edge signals to indicate when the horizontal raster scan line position is at a starting and terminal boundary of each window;
    memory address update counter means, which receives the starting window edge signal and a horizontal scan ending signal which indicates when the raster scan reaches the end of each horizontal scan line, for producing a memory address update signal in response to receiving either the starting window edge signal or the horizontal scan ending signal;

wherein the addressable memory means stores boundary information for each horizontal scan line of the raster scan, the boundary information comprises the end position of each horizontal scan line of the raster scan, and the starting and terminal boundary points of windows along each horizontal scan line, and the memory address means sequentially addresses locations containing the boundary points along each raster scan line in response to the memory address update signal.

4. The window signal generating device as defined in claim 3, wherein the window signal generating device further includes latch means for receiving the information stored in the memory locations addressed by the memory address means, and for latching the addressed information to the comparator means in response to receiving either a horizontal scan beginning signal or the terminal window edge signal.

5. The window signal generating device as defined in claim 1, wherein the addressable memory means comprises first and second memory devices, wherein the first memory device stores window starting boundary information and the second memory device stores window terminal boundary information.

6. The window signal generating device as defined in claim 1, wherein the comparator means comprises:
first and second comparator devices, wherein the first comparator device receives starting boundary information and the second comparator device receives terminal boundary information for each window, the first comparator device produces an after-boundary signal when the horizontal raster scan position has crossed the window starting boundary, and the second comparator device produces a before-boundary signal when the horizontal raster scan position has not crossed the window terminal boundary; and
gate means for receiving the after-boundary signal and the before-boundary signal and producing the window signal when the respective comparator devices produce the after- and before-boundary signals.

7. The window signal generating device as defined in claim 1, wherein the window signal generating device further includes scan data memory means for receiving and storing data scanned from objects within the windows.

8. The window signal generating device as defined in claim 1, wherein the stored boundary information includes information indicative of the starting and terminal boundaries on each horizontal scan line for each window.

9. A window signal generating device for use in a video scanning apparatus for producing a window signal when a video scanning position is within any predefined observation region window, comprising:
addressable memory means for storing information indicating the boundary of a plurality of windows, wherein the stored boundary information includes information indicative of the starting and terminal boundary points on each of a plurality of horizontal scan lines for each window, wherein each boundary point is independent of the boundary points on the immediately adjacent horizontal scan lines to thereby define windows of substantially any shape and orientation;
memory address means for addressing locations in the addressable memory means containing the stored boundary information for the horizontal scan line in response to a horizontal scan line signal;
counter means for receiving a horizontal synchronous signal and for producing a video scanning position signal; and
comparator means for receiving the video scanning position signal and the stored boundary information, and for producing a window signal when the video scanning position is within the boundary of a window.

10. The window signal generating device as defined in claim 9, wherein the addressable memory means stores boundary information for each horizontal scan line of a raster scan at sequential memory addresses.

11. The window signal generating device as defined in claim 9, wherein the video scanning position signal is a horizontal raster scan signal and further including:
window detector circuit means for receiving the window signal, and for producing window edge signals to indicate when the video scanning position is at the starting and terminal boundary of each window;
memory address update counter means, which receives the starting window edge signal and a horizontal scan ending signal which indicates when the raster scan reaches the end of each horizontal scan line, for producing a memory address update signal in response to receiving either the starting window edge signal or the horizontal scan ending signal;
wherein the addressable memory means stores boundary information for each horizontal scan line of the raster scan, the boundary information includes information indicative of the end position of each horizontal scan line of the raster scan and the starting and terminal boundary points of windows along each horizontal scan line of the raster scan, and the memory address means sequentially addresses locations containing the boundary points along each raster scan line in response to the memory address update signal.

12. The window signal generating device as defined in claim 11, wherein the window signal generating device further includes latch means for receiving the information stored in the memory locations addressed by the memory address means, and for latching the addressed information to the comparator means in response to receiving either a horizontal scan beginning signal or the terminal window edge signal.

13. The window signal generating device as defined in claim 9, wherein the addressable memory means comprises a first and second memory device, wherein the first memory device stores window starting boundary information and the second memory device stores window terminal boundary information.

14. The window signal generating device as defined in claim 9, wherein the comparator means comprises:
first and second comparator devices, wherein the first comparator device receives starting boundary information and the second comparator device receives terminal boundary information for each window, the first comparator produces an after-boundary signal when the video scanning position has crossed the window starting boundary, and the second comparator produces a before-boundary signal when the video scanning position has not crossed the window terminal boundary; and gate means for receiving the after-boundary signal and the before-boundary signal and producing the window signal when the respective comparator devices produce the after- and before-boundary signals.

15. The window signal generating device as defined in claim 9, wherein the window signal generating device further includes scan data memory means for receiving and storing data scanned from objects within the windows.

* * * * *